United States Patent Office 3,790,506
Patented Feb. 5, 1974

3,790,506
EPIHALOHYDRIN RUBBER VULCANIZATION
Henry C. Tillson, Wilmington, Del., assignor to
Hercules Incorporated, Wilmington, Del.
No Drawing. Filed Oct. 26, 1972, Ser. No. 301,002
Int. Cl. C08g 43/00, 51/84
U.S. Cl. 260—2 A                6 Claims

ABSTRACT OF THE DISCLOSURE

Epihalohydrin polymers can be rapidly cross-linked by heating with imidazole having the formula

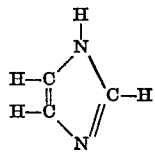

to produce useful vulcanizates less subject to compression set.

---

The present invention relates to vulcanized epihalohydrin polymers and to their preparation.

Epihalohydrin have been vulcanized, i.e., cross-linked in the past with polyamines alone or monoamines in the presence of agents such as sulfur, diazocarbamate, thiuram sulfide or thiazole to produce rubbers that have good attributes and can be used in diverse specialty rubber applications. It has recently been shown that epihalohydrins can be vulcanized with a mixture of a lower alkyl imidazole and a diazabicyclo compound such as triethylenediamine or C-methyl triethylenediamine, as shown in U.S. Pat. 3,414,529. However, this recently patented vulcanization process is too slow for commercial application without using a post-cure.

Now in accordance with this invention, it has unexpectedly been found that high molecular weight polymers and copolymers of epihalohydrins can be rapidly and efficiently cross-linked with imidazole having the formula

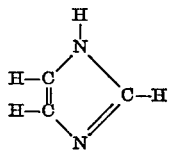

It is most preferred, but not absolutely necessary, that there be present in addition to the imidazole at least one metal compound selected from the group consisting of salts of aromatic carboxylic acids, salts of aliphatic carboxylic acids, salts of carbonic acid, salts of phosphorous acid, salts of silicic acid and oxides of the metals of Groups II–A, II–B, and IV–A of the Periodic Table (Lange's Handbook of Chemistry, 8, pages 56–57, 1952).

Any high molecular weight solid polymer, homopolymer or copolymer of an epihalohydrin as, for example, epichlorohydrin or epibromohydrin homopolymers, copolymers of two different epihalohydrins, or copolymers of an epihalohydrin with one or more other epoxides or oxetanes can be cross-linked to produce the new vulcanizates of this invention. These polymers are readily prepared by the polymerization of epihalohydrins with, for example, organoaluminum compounds as catalysts. Particularly effective catalysts for the polymerization of epihalohydrins are alkylaluminum compounds that have been reacted with from about 0.2 to about 1 mole of water per mole of alkylaluminum compound. The polymers obtained by these catalysts may be essentially wholly amorphous or crystalline or they may be a mixture of the amorphous and crystalline polymers. Generally, the amorphous polymers provide the most rubbery vulcanizates, the crystalline polymers on vulcanization tending to be hard, brittle, and lacking in elasticity. These properties are, of course, useful in the case of relatively rigid molded articles which can be prepared by molding the compounded polymer and then curing to cross-link and set it. However, excellent rubbers are obtained by vulcanizing mixtures of amorphous and crystalline polymers. In this case, the amount of the crystalline polymer is generally less than about 25–30% of the mixture.

When epihalohydrins are polymerized by the above process, polymerization takes place at least in major part through the epoxide linkage so that the product is a polyether containing halomethyl groups attached to the main polymer chain. The homopolymers are believed to have the following general formula:

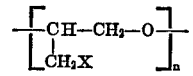

where X is halogen. In the same way, when an epihalohydrin is copolymerized with one or more other epoxides or oxetanes (including other epihalohydrins), polymerization takes place through the epoxide or oxetane linkage even though other polymerizable groups may be present. Typical of epoxides and oxetanes that can be polymerized with an epihalohydrin to produce a copolymer that can be cross-linked in accordance with this invention are the alkylene oxides such as ethylene oxide, propylene oxide, butene oxide, etc.; butadiene monoxide, cyclohexene oxide, vinyl cyclohexene oxide, epoxide ethers such as ethyl glycidyl ether, 2-chloroethyl glycidyl ether, hexyl glycidyl ether, allyl glycidyl ether, etc.; trimethylene oxide (oxetane), alkyl substituted oxetanes, such as 2-ethyloxetane, 3-butyloxetane, 3,3-dimethyloxetane, etc.; haloalkyl substituted oxetanes such as 2-chloromethyloxetane, 3-iodopropyloxetane, etc.; alkoxy substituted oxetanes such as 2-ethoxyoxetane, 3-propoxyoxetane, etc.; alkoxyalkyl substituted oxetanes such as 2-butoxymethyloxetane, 3-hexoxymethyloxetane, etc.; haloalkoxy substituted oxetanes such as 2-bromobutoxyoxetane, 3-fluoromethoxyoxetane, etc.; haloalkoxyalkyl substituted oxetanes such as 2-chloroethoxymethyloxetane, 3-fluoromethoxymethyloxetane, etc. The copolymers will in general contain at least about 10% by weight of an epihalohydrin monomer.

As pointed out above, the polymers of an epihalohydrin that are vulcanized, i.e., cross-linked in accordance with this invention, are high molecular weight solid polymers. Any homopolymer or copolymer that has a reduced specific viscosity of at least about 0.2, i.e., a molecular weight of at least about 40,000, can be cross-linked with the agent of this invention to yield a polymer of increased tensile strength and modulus. The term "Reduced Specific Viscosity" (RSV) which is a function of molecular weight, is used herein to designate the specific viscosity measured at 100° C. on an α-chloronaphthalene solution of the polymer containing 0.1 g. per 100 ml. of solution divided by the concentration of the solution. Polymers having an RSV above about 0.2, and preferably above about 0.5, on cross-linking yield excellent general purpose specialty rubbers.

These epihalohydrin polymers generally contain a small amount (i.e., from about 0.1% to about 2% by weight) of antioxidant added at the time of their preparation. It may in some cases be desirable to add a small additional amount of antioxidant before or at the time of cross-linking the polymer. Exemplary of the most preferable antioxidants are phenyl-β-naphthylamine, di-β-naphthyl-p-phenylenediamine, sym-di-β-naphthyl-p-phenylenediamine, N-isooctyl-p-aminophenol, the reaction product of diphenylamine and acetone, polymerized trimethyldihydroquinoline, 4,4'-thio-bis(6-tert-butyl-m-cresol), the reaction product of crotonaldehyde and 3-methyl-6-tert-butylphenol, nickel dibutyldithiocarbamate, nickel dimethyldithiocarbamate, and the zinc salt of 2-mercaptobenzimidazole.

Epihalohydrin polymers are cross-linked in accordance with this invention by heating a mixture of the polymer and imidazole.

As indicated above, it is most desirable to use the imidazole as a cross-linking agent for epihalohydrin polymers in combination with one or more metal compounds. These metal compounds are selected from the group consisting of salts of aromatic carboxylic acids, salts of aliphatic carboxylic acids, salts of carbonic acid, salts of phosphorous acid, salts of silicic acid and oxides of the metals of Periodic Groups II–A, II–B and IV–A. Exemplary of these metal compounds are stannous oxide, stannic oxide, lead monoxide, red lead oxide, germanium monoxide, calcium oxide, zinc oxide, magnesium oxide, zinc carbonate, lead carbonate, dibasic lead carbonate, calcium carbonate, mercuric carbonate, beryllium carbonate, lead orthosilicate, barium silicate, cadmium silicate, magnesium silicate, dibasic lead phthalate, magnesium benzoate, calcium benzoate, zinc salicylate, strontium salicylate, lead azelate, lead oleate, dibasic lead stearate, calcium stearate, lead sebacate, the lead salt of tetradecane dibasic acid, dibasic lead phosphite and magnesium phosphite.

Those metal compounds containing lead are most preferred since they tend to increase the stability of the product against heat oxidative degradation. Therefore, it may be desirable to add at least a small amount, i.e., from about 0.2% to about 10% by weight of a lead compound, even when one or more other metal compounds are being used. Particularly effective in improving heat aging resistance are the lead salts of aliphatic dicarboxylic acids containing from about 4 to 14 carbon atoms, such as adipic, suberic, azelaic, sebacic and tetradecane dibasic acids. These compounds may be added directly in the form of the salt or as the combination of a lead oxide with an aliphatic dicarboxylic acid, which will form the lead salt in situ. Of course, there are cases in which a stabilizer is not required and excellent vulcanizates can be obtained without it.

Varied amounts of the cross-linking agent can be added and the optimum amount will depend upon the degree of cross-linking desired, the presence of stabilizers, etc. Generally, the amount added (based on the weight of the polymer) will be within the following ranges, from about 0.05% to about 10%, preferably from about 0.1% to about 5% of imidazole. If a metal compound is present, it will be within the following range, from about 2% to about 20%.

The cross-linking agent (and metal compound, if one is used) can be incorporated or admixed with the polymer in any desired fashion. For example, they can be uniformly blended with the polymer by simply milling on a conventional rubber mill or mixing in a banbury mixer. By this means, the agents are uniformly distributed throughout the polymer and uniform cross-linking is effected when the blend is subjected to heat. It is generally preferable to mill at temperatures within the range of from about 160° F. to about 190° F. Other methods of admixing the cross-linking agent with the polymer will be apparent to those skilled in the art.

The conditions under which the cross-linking is effected can be varied over a wide range. The temperature at which the blend of polymer and cross-linking agent is heated will, to a great extent, determine the time required for cross-linking. In general, the cross-linking temperature will be within the range of from about 300° F. to about 400° F. The time will vary inversely with the temperature and will range from about 4 minutes to 160 minutes. Cross-linking will generally be conducted in metal molds under a compression of at least about 500 p.s.i.

In addition to the cross-linking agent (and metal compound, if one is used), other ingredients can also be incorporated. The additives commonly used in rubber vulcanization can be used here also, as for example, extenders, fillers, pigments, plasticizers, softeners, etc. The presence of a filler such as carbon black or high surface area silica is beneficial and, as in rubber compounding, gives optimum results. Obviously, there are many cases in which a filler is not required or desired and excellent results are achieved when only the cross-linking agent is added.

The following examples will illustrate the process of cross-linking epihalohydrin polymers in accordance with this invention and the vulcanizates so obtained. All parts and percentages are by weight.

GENERAL PROCEDURE FOR PREPARATION OF VULCANIZATES

In all of the examples, unless otherwise indicated, polymer stocks are made up by mixing on a 2-roll mill (rolls maintained at about 170° F.) 100 parts of dry polymer with the specified cross-linking agent and any other additives for about 10 minutes. The polymer is first added to the mill and when it bands (within about 2 minutes), the other ingredients are added in the general order: lubricant, carbon black or other filler, followed by metal compound, followed by antioxidant, followed by imidazole. Where recipes indicate omissions, the order of addition is merely advanced. Curing is carried out by two different methods in the examples—(1) by heating in an oscillating disk rheometer and/or (2) by heating in a two-part mold. The first method, namely cross-linking in an oscillating disk rheometer, is described in ASTM D–2705–68T. By this method, the extent of cross-linking may be indicated by the inch-pounds of torque required to twist the sample. Completion of cross-linking may be characterized by the maximum inch-pounds of torque recorded when plotted against time. Cross-linking acceleration is measured by the difference in torque at any given time, $t$, of a sample containing the cross-linking agent as compared to a control sample without the agent at the same time $t$. The second method is the more traditional method of curing in 2-part steel molds for 45 minutes at 340° F., under 500 p.s.i. minimum pressure. Using the second method, specimen thickness is approximately 80 mils.

EXAMPLES 1 AND 2

These examples illustrate the cross-linking of an epihalohydrin polymer using imidazole alone and in combination with a metal compound.

The amounts of ingredients (by parts) in the polymer stocks are tabulated below:

|  | Parts | |
|---|---|---|
|  | Ex. 1 | Ex. 2 |
| Epichlorohydrin–ethylene oxide copolymer [1] | 100 | 100 |
| Sorbitan monostearate, lubricant | 1 | 1 |
| Fast extruding furnace black | 50 | 50 |
| Red lead | None | 5 |
| Nickel dibutyl dithiocarbamate | 1 | 1 |
| Imidazole | 0.5 | 0.5 |

[1] Containing approximately 65 weight percent epichlorohydrin and 35% ethylene oxide and having a molecular weight of approximately 1,500,000.

Samples of each polymer stock are cured in an oscillating disk rheometer at 340° F. The effect of cross-linking in the presence of imidazole alone and with imidazole plus red lead is tabulated below:

|  | Ex. 1 | Ex. 2 |
|---|---|---|
| Inch-pounds of torque at 30 minutes | 60.4 | 97.8 |
| Time in minutes required to reach 95% of maximum torque | 42 | 47 |
| Maximum torque, inch-pounds | 70 | 113 |

The above procedure is carried out omitting the imidazole and no substantial cross-linking occurs.

EXAMPLES 3-6

These examples illustrate the cross-linking of epihalohydrin polymers comparing imidazole with 2-mercaptoimidazoline.

The amounts of ingredients (by parts) in the polymer stocks are tabulated below.

| Ingredients | Parts | | | |
|---|---|---|---|---|
| | Ex. 3 | Ex. 4 | Ex. 5 | Ex. 6 |
| Epichlorohydrin-ethylene oxide copolymer [1] | 100 | 100 | | |
| Epichlorohydrin homopolymer [2] | | | 100 | 100 |
| Sorbitan monostearate, lubricant | 1 | 1 | 1 | 1 |
| Fast extruding furnace black | 50 | 50 | 50 | 50 |
| Red lead | 5 | 5 | 5 | 5 |
| Nickel dibutyl dithiocarbamate | 1 | 1 | 1 | 1 |
| 2-mercaptoimidazoline | 1.5 | | 1.5 | |
| Imidazole | | 0.48 | | 0.45 |

[1] As described in Examples 1 and 2.
[2] Elastomeric homopolymer having a molecular weight of approximately 500,000.

Before curing, Mooney scorch (M.S.) is determined at 250° F. using a small rotor. The determinator are tabulated below:

| | Ex. 3 | Ex. 4 | Ex. 5 | Ex. 6 |
|---|---|---|---|---|
| Time, in minutes, required for a 3 point rise in viscosity | 7.0 | 28.3 | 8.5 | 25.0 |
| Time, in minutes, required for a 5 point rise in viscosity | 8.0 | 35.0 | 10.3 | 29.0 |

It can be seen from the above that the polymer stocks containing imidazole are much more resistant to scorch than are the stocks containing 2-mercaptoimidazoline.

Samples of each polymer stock are cured in an oscillating disk rheometer at 340° F. The torque in inch-pounds after curing for various times is tabulated below:

| Time | Torque | | | |
|---|---|---|---|---|
| | Ex. 3 | Ex. 4 | Ex. 5 | Ex. 6 |
| Initially (minimum) | 13.5 | 13.0 | 9.5 | 9.7 |
| 30 minutes | 113.5 | 81.4 | 89.5 | 101.0 |
| 60 minutes | 121.5 | 101.4 | 102.0 | 111.5 |
| 120 minutes | 125.3 | 106.0 | 108.8 | 115.0 |

From the above, it can be seen that both imidazole and 2-mercaptoimidazoline give good tight cures.

Samples of each polymer stock are cured in 2-part steel molds for 45 minutes at 340° F. under 500 p.s.i. pressure. Specimens of the press-cured stock are tested to determine physical properties and the results tabulated below:

| Unaged physical properties: | Ex. 3 | Ex. 4 | Ex. 5 | Ex. 6 |
|---|---|---|---|---|
| Modulus 100% p.s.i | 1,105 | 825 | 1,130 | 1,315 |
| Modulus 200% p.s.i | 1,995 | 1,580 | 2,000 | 2,265 |
| Tensile strength, p.s.i | 2,160 | 1,945 | 2,350 | 2,325 |
| Elongation, percent | 260 | 300 | 270 | 220 |
| Hardness, Shore A | 78 | 76 | 77 | 80 |
| Aged 70 hours at 302° F. in No. 3 oil: | | | | |
| Modulus 100% p.s.i | 1,055 | 1,185 | 1,210 | 1,535 |
| Modulus 200% p.s.i | 2,140 | 2,100 | 2,300 | 2,520 |
| Tensile strength, p.s.i | 2,485 | 2,310 | 2,640 | 2,520 |
| Elongation, percent | 250 | 240 | 240 | 200 |
| Hardness, Shore A | 74 | 74 | 71 | 76 |
| Volume swell, percent | 10.9 | 8.1 | 13.7 | 10.9 |
| Aged 70 hours in boiling water: | | | | |
| Modulus 100% p.s.i | 1,095 | 950 | 1,135 | 1,350 |
| Modulus 200% p.s.i | 2,055 | 1,865 | 2,205 | |
| Tensile strength, p.s.i | 2,330 | 2,090 | 2,660 | 2,315 |
| Elongation, percent | 240 | 230 | 250 | 180 |
| Hardness, Shore A | 71 | 74 | 71 | 75 |
| Volume swell, percent | 16.6 | 10.9 | 10.9 | 5.4 |

Samples of each polymer stock are again cured in 2-part steel molds for 50 minutes (one set is post-cured for 6 hours at 302° F.) at 340° F. under 500 p.s.i. pressure and then tested in accordance with ASTM D395-69 method B for compression set after being compressed 25% of their thickness for 70 hours at 302° F. The results are tabulated below:

| | Percent compression set | | | |
|---|---|---|---|---|
| | Ex. 3 | Ex. 4 | Ex. 5 | Ex. 6 |
| Cured 50 minutes | 59.0 | 48.0 | 61.0 | 36.0 |
| Cured 50 minutes plus 6 hours post-cure | 48.0 | 38.5 | 51.0 | 34.0 |

It can be seen from the above that the samples cured with imidazole are much less subject to compression set than those cured with 2-mercaptoimidazoline.

EXAMPLES 7 AND 8

These examples illustrate the cross-linking of an epihalohydrin polymer using imidazole as compared with using an alkyl-substituted imidazole.

The amounts of ingredients (by parts) in the polymer stocks are tabulated below:

| Ingredients | Parts | |
|---|---|---|
| | Ex. 7 | Ex. 8 |
| Epichlorohydrin—ethylene oxide copolymer [1] | 100 | 100 |
| Sorbitan monostearate, lubricant | 1 | 1 |
| Fast extruding furnace black | 50 | 40 |
| Red lead | 5 | 50 |
| Nickel dibutyl dithiocarbamate | 1 | 1 |
| Imidazole | 0.48 | |
| 2-ethyl-4-methyl imidazole | | 1.1 |

[1] As described in Examples 1 and 2.

Samples of each polymer stock are cured in an oscillating disk rheometer at 340° F. The effect of cross-linking using imidazole as compared to using the alkyl-substituted imidazole is tabulated below:

| | Ex. 7 | Ex. 8 |
|---|---|---|
| Initial torque (minimum), inch-pounds | 12.2 | 11.0 |
| Time, in minutes, required to reach 95% of maximum torque | 54 | 124.5 |
| Maximum torque, inch-pounds | 110.8 | 83.3 |

It can be seen from the above that the alkyl-substituted imidazole takes over twice as long (too long for commercial application) to cure as the unsubstituted imidazole of this invention.

Samples of each polymer stock are cured in 2-part steel molds at 340° F. under 500 p.s.i. pressure. The time each sample is cured and its compression set is tabulated below:

| | Ex. 7 | Ex. 8 |
|---|---|---|
| Press cure at 340° F., minutes | 45 | 130 |
| Compression set (70 hours at 302° F.) percent | 45 | 57 |

From the above, it can be seen that the sample cross-linked with the alkyl-substituted imidazole takes a much higher set after compression.

What I claim and desire to protect by Letters Patent is:

1. A cross-linked polymer selected from the group consisting of epihalohydrin homopolymer, copolymers of two different epihalohydrins, and copolymers of an epihalohydrin with one or more other mono-oxiranes or mono-oxetanes prepared by heating said polymer in the presence of a small amount of imidazole having the general formula

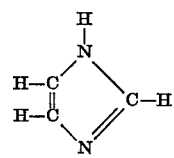

2. The composition of claim 1 wherein, in addition to imidazole, the cross-linked polymer was heated in the presence of at least one metal compound selected from the group consisting of salts of aromatic carboxylic acids, salts of aliphatic carboxylic acids, salts of carbonic acid, salts of phosphorous acid, salts of silicic acid and oxides of the metals of Groups II–A, II–B, and IV–A of the Periodic Table.

3. The composition of claim 2 wherein the metal compound is a lead oxide.

4. The process of cross-linking a polymer selected from the group consisting of epihalohydrin homopolymer, copolymers of two different epihalohydrins, and copolymers of an epihalohydrin with one or more other mono-oxiranes or mono-oxetanes which comprises heating said polymer in the presence of a small amount of imidazole having the general formula

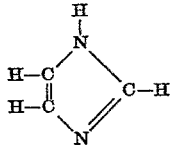

5. The process of claim 4 wherein, in addition to imidazole, the polymer is heated in the presence of at least one metal compound selected from the group consisting of salts of aromatic carboxylic acids, salts of aliphatic carboxylic acids, salts of carbonic acid, salts of phosphorous acid, salts of silicic acid and oxides of the metals of Group II–A, II–B and IV–A of the Periodic Table.

6. The process of claim 5 wherein the metal compound is a lead oxide.

References Cited
UNITED STATES PATENTS

| | | | |
|---|---|---|---|
| 3,341,491 | 9/1967 | Robinson et al. | 260—45.75 |
| 3,448,063 | 6/1969 | Breslow | 260—2 |
| 3,700,650 | 10/1972 | Mani et al. | 260—79 |
| 3,708,461 | 1/1973 | Karastu et al. | 260—79 |
| 3,726,841 | 4/1973 | Mirolli et al. | 260—79 |

WILLIAM H. SHORT, Primary Examiner

E. A. NIELSEN, Assistant Examiner

U.S. Cl. X.R.

260—45.9 P

UNITED STATES PATENT OFFICE
CERTIFICATE OF CORRECTION

Patent No. 3,790,506              Dated February 5, 1974

Inventor(s) Henry C. Tillson

It is certified that error appears in the above-identified patent and that said Letters Patent are hereby corrected as shown below:

Column 2, lines 25 & 26; "polymerized" should read --copolymerized--

Column 5, line 25; "determinator" should read --determinations--.

Column 6, under Ex. 8, line 24; "40" should read --50--

Column 6, under Ex. 8, line 25; "50" should read --5--

Signed and sealed this 25th day of June 1974.

(SEAL)
Attest:

EDWARD M. FLETCHER, JR.
Attesting Officer

C. MARSHALL DANN
Commissioner of Patents